United States Patent [19]

Kelland

[11] 4,456,429
[45] Jun. 26, 1984

[54] WIND TURBINE

[76] Inventor: Robert E. Kelland, 104 Watson Crescent, St. John's Newfoundland, Canada

[21] Appl. No.: 357,939

[22] Filed: Mar. 15, 1982

[51] Int. Cl.³ .............................................. F03D 7/06
[52] U.S. Cl. .................................... 416/117; 416/119; 416/DIG. 8
[58] Field of Search .................... 416/119, 117, 140 R, 416/DIG. 8

[56] References Cited

U.S. PATENT DOCUMENTS

| 4,105,363 | 8/1978 | Loth | 416/41 |
| 4,180,372 | 12/1979 | Lippert | 416/23 |
| 4,274,809 | 6/1981 | Delgado et al. | 416/117 |
| 4,334,823 | 6/1982 | Sharp | 416/119 |
| 4,368,392 | 1/1983 | Drees | 416/119 X |

FOREIGN PATENT DOCUMENTS

| 1045038 | 12/1978 | Canada | 416/139 A |
| 1118687 | 2/1982 | Canada | 416/119 |
| 2745862 | 4/1979 | Fed. Rep. of Germany | 416/119 |
| 2948060 | 6/1981 | Fed. Rep. of Germany | 416/176 A |
| 2481756 | 11/1981 | France | 416/17 |
| 2040363 | 8/1980 | United Kingdom | 416/DIG. 8 |
| 2082260 | 3/1982 | United Kingdom | 416/132 B |

Primary Examiner—Everette A. Powell, Jr.
Attorney, Agent, or Firm—Sughrue, Mion, Zinn, Macpeak and Seas

[57] ABSTRACT

A wind turbine comprises a vertical, rotatable shaft and at least one arm, preferably two or more arms, extending radially outwardly from the shaft and rigidly connected thereto at one end. An aerofoil-shaped blade is connected to the other end of each arm and has a normal operating position in which the blade chord line at the point where the blade connects to the arm is generally normal to a longitudinal axis of the respective arm. The leading edge of the blade is disposed at a fixed acute angle relative to the vertical at all rotational speeds of the blade about the axis of the shaft. The arms preferably also have an aerofoil-shape. An overspeed control mechanism is provided to prevent the blade and arm from rotating beyond a predetermined speed limit about the shaft. The control mechanism includes a hinge mount pivotally connecting the blade to its respective arm. The blade is able to move under excessive speed conditions from the normal operating position to a position wherein the blade creates increased drag. A spring arrangement restores the blade to its normal operating position when the speed limit is no longer being exceeded.

17 Claims, 12 Drawing Figures

WIND TURBINE

BACKGROUND OF THE INVENTION

This invention relates to fluid operated apparatus capable of providing a source of power or generating power and particularly relates to vertical axis wind mills or wind turbines.

The use of and capabilities of vertical axis wind turbines is known and these wind mills or wind turbines can take a variety of shapes and configurations. Fixed pitch, lift-type vertical axis wind turbines have until recently been limited in manufacture and use due to two main difficulties that have been encountered. Firstly, positive, aerodynamic overspeed control was not available for such turbines Also, the sizeable bending loads on the blades required the use of struts and/or wire to prevent bending. Alternatively, the blades must be shaped in a catenary form which reduces the bending loads on the blades to a minimum. The use of supporting struts and wires introduces drag and lowers the efficiency of the tubine while forming the blade in a catenary shape is difficult and expensive.

In U.S. Pat. No. 4,087,202 issued May 2, 1978 to National Research Development Corporation, there is taught a vertical axis wind turbine having two straight aerofoil-shaped blades, each of which is attached by a hinge to the outer end of a horizontally extending radial arm. The blades are each of aerofoil section NACA 0012 and have constant widths and thickness along their length. The arms are also of aerofoil section. A mechanism is provided which permits the blades to increase their angle of inclination relative to the vertical axis when the speed of rotation increases beyond the normal operating range whereby the rate of increase of rotational speed with wind speed is reduced.

U.S. Pat. No. 4,087,202 teaches a positive aerodynamic speed control mechanism that employs exposed tie wires and a spring. The exposed tie wires further reduce turbine efficiency under normal turbine speeds. Furthermore, it is believed that the Musgrove mechanism for limiting the speed of the wind turbine would not be very suitable for preventing turbine damage due to icing.

SUMMARY OF THE INVENTION

It is an object of the invention to provide a fluid operated device capable of providing a power source which has improved efficiency over previously known devices.

According to one aspect of the invention, a fluid operated apparatus for providing a power source provides a vertical rotatable shaft and at least one arm extending radially outwardly from said shaft and rigidly connected thereto at one end. An elongated, aerofoil-shaped blade is connected to the other end of the one arm. In a normal operating position, the blade chord line at the point where the blade connects to the arm is generally normal to a longitudinal axis of the arm. The leading edge of the blade is disposed at a fixed acute angle relative to the vertical at all rotational speeds of the blade about the axis of the shaft. The angle defined by the leading edge of the blade is located in a plane generally tangential to the path of rotation of the blade.

According to another aspect of the invention, a wind turbine comprises a vertical, rotatable shaft and at least one arm extending horizontally outwardly from the shaft and fixedly connected thereto. An elongated aerofoil-shaped blade is pivotally connected to the other end of the arm so that the blade can pivot about a non-horizontal axis. In a normal operating position, the blade chord line at the point where the blade connects to the arm is perpendicular to a longitudinal axis of the one arm. The length of the blade always extends at a substantial fixed angle to the horizontal, which angle is located in a plane generally tangential to the path of rotation of the blade. Means are provided for biasing the blade towards the normal operating position. The biasing mechanism is overcome by centrifugal forces acting on the blade when the rotational speed of the blade reaches a predetermined limit resulting in the blade pivoting to a drag position.

With the use of the preferred wind turbine disclosed herein, the efficiency is greatly increased. Exposed tie wires to control the operation of the blades are not required. With the use of the positive speed control mechanism disclosed herein, the present wind turbine can remain operating in extreme wind conditions without overspeeding and, as a result, the wind turbine has a higher annual power output. Many previously known wind turbines must be shut down in extreme wind conditions either because they have no speed control mechanisms or the mechanisms that they have are inadequate. It is quite important from the aspect of personnel and property safety that a windmill have a positive speed limiting mechanism.

One method of controlling speed in conventional vertical turbines has involved the use of relatively small air brakes mounted on the trailing edge of the turbine blades "generally near the equatorial radius". These known spoilers are generally spring loaded and activated by centrifugal forces and/or hydraulic actuators. The reliability of such devices is questionable under severe icing conditions when the spoilers may fail to activate because of the joint made by ice build up and their relatively small mass. On the other hand, the speed control mechanism described herein employs the entire blade as an air brake or spoiler and this greatly reduces the possibility of blade deployment being hindered by icing.

With the preferred blade construction disclosed herein the hinging point is located on the blade surface at a point which would favour early braking action by the blade if ice should be building up on its surface. The ice build up would increase the effective mass of the blade behind the hinge point, thus enabling the blade to more readily overcome the inwardly biasing forces and pivot to a drag creating position.

BRIEF DESCRIPTION OF THE DRAWINGS

The present invention will be best understood from the following detailed description of a preferred embodiment given in conjunction with the accompanying drawings wherein.

DETAILED DESCRIPTION OF PREFERRED EMBODIMENTS

Figure 1:
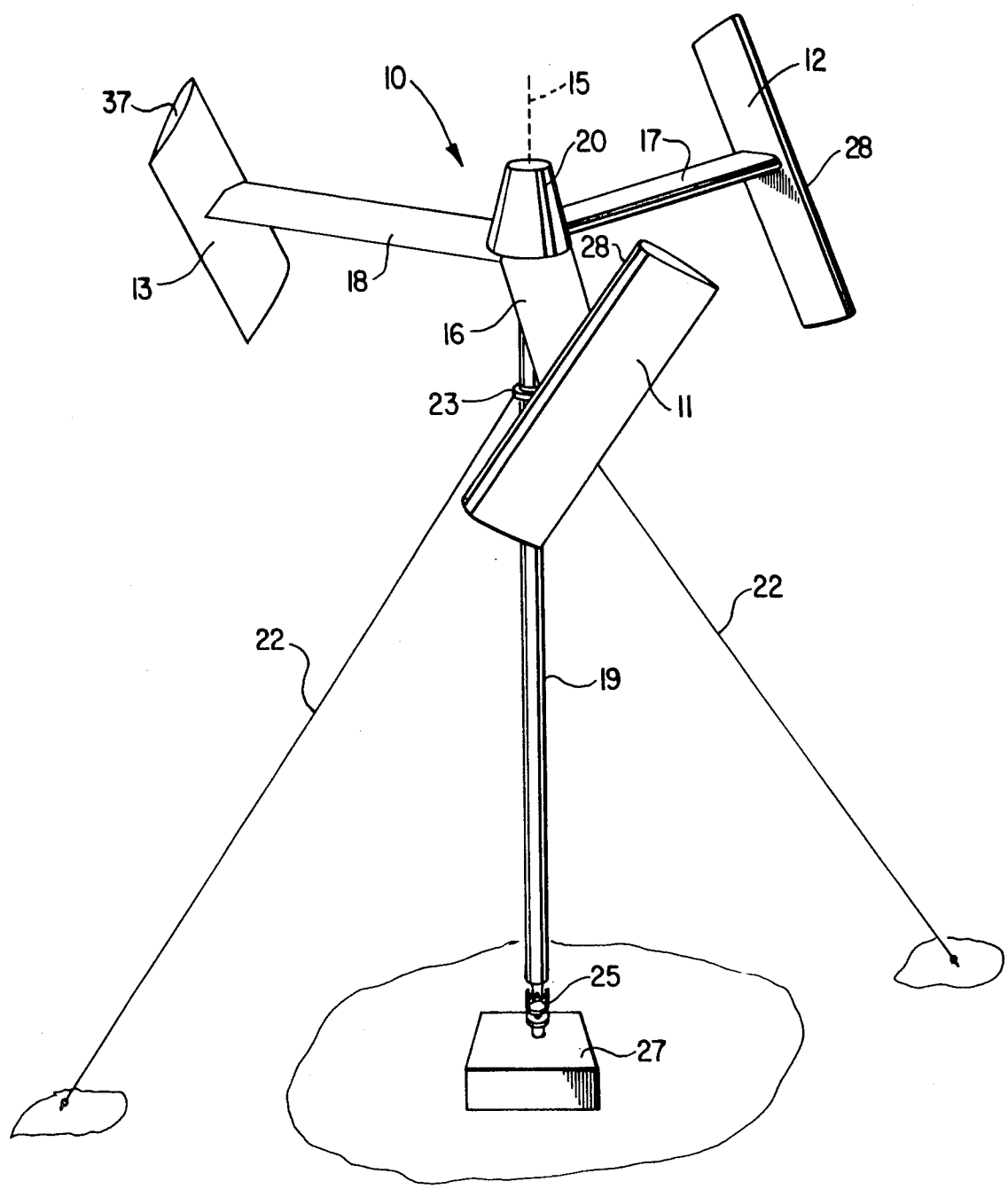
FIG. 1 is a perspective view of a wind turbine constructed in accordance with the teachings of the present invention.

In the fluid operated apparatus 10 of FIG. 1 there are three aerofoil-shaped blades 11 to 13 mounted to rotate about a vertical axis indicated generally by the line 15. It will be understood that the number of blades which can be used is optional and the number can vary from a single blade to more than three blades. In the case where a single blade is used, the blade would be counterbalanced in an appropriate manner so that it will rotate freely about the vertical axis. The illustrated blades 11 to 13 are symmetrical, constant chord blades but it will be understood that the blades could be cambered and have a shape other than that shown. Each blade is straight and has a uniform width. Each blade 11 to 13 is mounted on a respective one of three arms 16 to 18. The three arms extend radially outwardly in a horizontal plane from a supporting, vertical shaft 19 (see FIG. 4). Each of the arms 16 to 18 also has an aerofoil shape and preferably the arms are symmetrical and have a constant chord. Each blade 11 to 13 is pivotally connected to its respective support arm in a manner described hereinafter. A protective shroud or cover 20 is mounted in the region where the arms connect to the vertical shaft 19. The function of this shroud will become clearer from the description hereinafter. The shroud could be constructed from three parts, each essentially triangular in shape, with one of the parts being removable for maintenance and adjustment of the mechanical parts and devices protected by the shroud.

As illustrated in FIG. 1, the vertical shaft 19 can be supported in the vertical position by suitable guy wires 22, the bottom ends of which are fastened firmly to the ground or other supporting surface. At their upper ends the guy wires attach to a self-aligning flanged bearing housing 23 and a suitable retaining collar (not shown). The lower end of the shaft 19 can be attached to a universal joint 25. The joint 25 is in turn coupled to a suitable bearing arrangement which is capable of supporting the downward thrust load and by means of a known coupling permits attachment to a power generating device located in housing 27. The universal joint 25 provides for any misalignment of the wind turbine assembly and also permits the turbine assembly to be erected relatively easily either at the time of initial installation or after maintenance has been carried out. It will be appreciated that the turbine assembly including the shaft 19 is able to pivot from a horizontal position to the upright position shown in FIG. 1 about the "hinge" provided by joint 25. The bottom end of the shaft 19 can either be connected to an electrical alternator or to a speed increaser mechanism. If the shaft is connected to the latter, an alternator would be connected to the speed increaser mechanism if electrical power is to be generated by the wind turbine. Preferably the illustrated housing 27 would be mounted on a firm concrete base. Support arrangements other than that illustrated in FIG. 1 could of course be used to mount the wind turbine at a location where it will be subject to sufficient wind forces.

A preferred construction of the vertical blades 11 to 13 will now be described. It should be noted that, as will be seen from FIG. 1, the leading edge 28 of each blade is disposed at a fixed acute angle relative to the vertical and this angle is maintained at all rotational speeds of the blade about the vertical axis 15. Arranging the vertical blades in this manner increases the aerodynamic efficiency of the blade greatly as compared to blades having a longitudinal axis or length that extends vertically. The reason for this improved efficiency will be explained further hereinafter. In the embodiments shown in FIG. 2, the blade chord line of each blade is generally normal to the longitudinal axis of the adjoining arm. This position of the blade chord line is maintained at normal operational speeds of the wind turbine.

Figure 5:
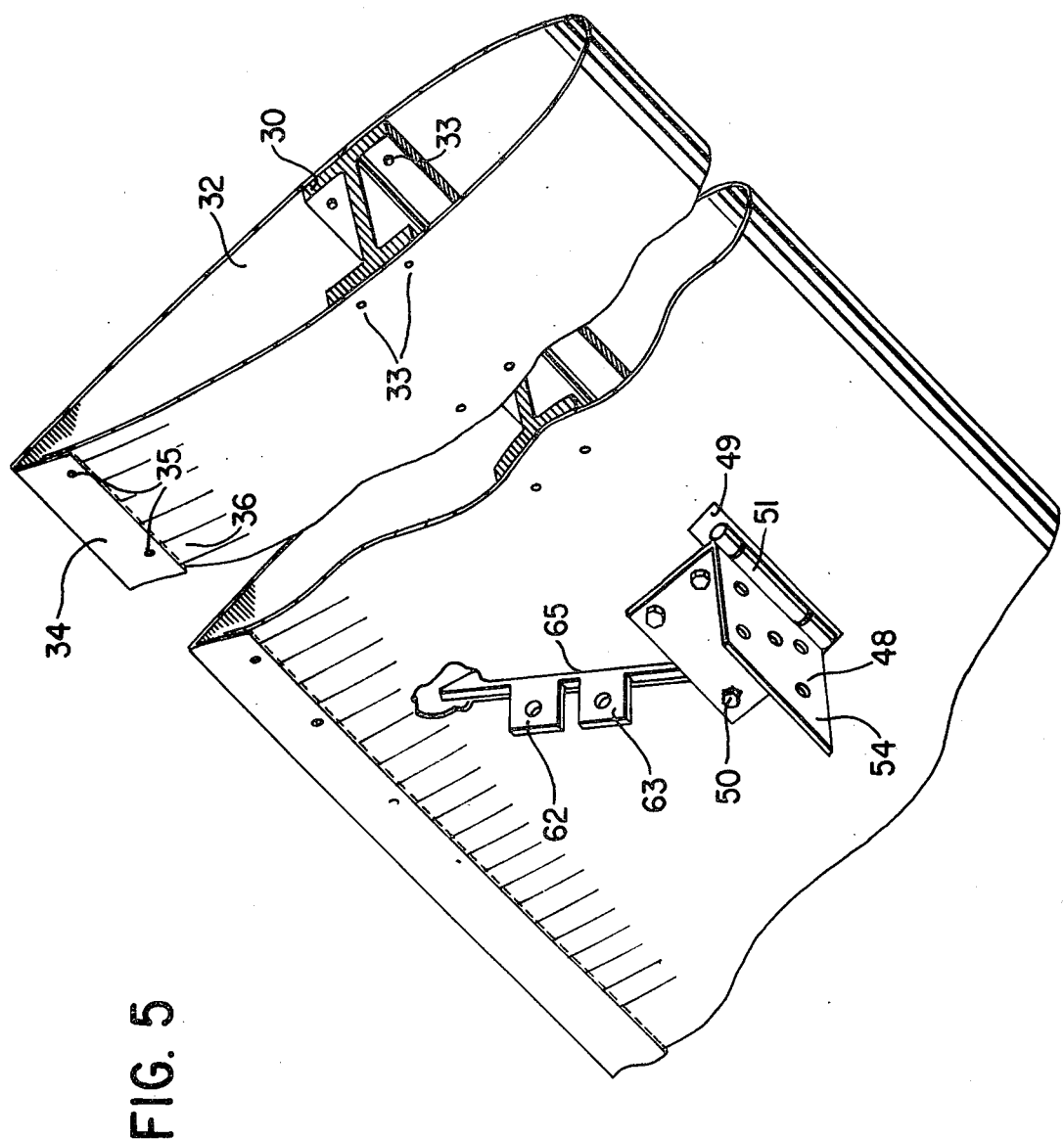
FIG. 5 is a detail showing the portion of the blade that is connected to the supporting arm.

The construction of each blade 11 to 13 can best be seen from FIG. 5. Extending the length of each blade is a main structural member in the form of an I-beam 30. The beam is preferably made from aluminum or a lightweight alloy. Surrouding the beam 30 is the wing surface material which is bent in the shape of an aerofoil. The sheet material can be aluminum or stainless steel and it forms the blade skin 32. The skin 32 is attached along both surfaces by means of blind rivets 33 to the I-beam 30. A lap joint 34 is formed at the trailing edge of the blade and is secured with further blind rivets 35. When the blades are being constructed, the aerofoil-shape of the skin 32 is deliberately distorted near the trailing edge during the initial fabrication. The desired shape is then regained by application of a flexible epoxy filler at 36 towards the end of the fabrication procedure. Materials other than metal could be used to construct the blades of the invention and such materials might include wood, fiber glass, and plastic. A wide variety of materials is permitted if one uses the preferred wind turbine construction disclosed herein because, with this construction, the maximum speed of the turbine is limited and thus undue stress on the blade material can be avoided. When using the illustrated method of construction for the blades, the center of the I-beam should preferably be located approximately 30% of the chord length from the leading edge of the blade. At this point the blade has the greatest thickness and the sides of the blade formed by skin 32 are essentially parallel. With the preferred illustrated arrangement, there is a minimum disfiguration of the desired aerofoil shape and the weight of the blade is distributed in a favourable manner which permits the blade to pivot due to centrifugal forces as described more fully hereinafter. The illustrated blade construction provides the skin 32 with significant resistance to torsional twisting.

Figure 2:
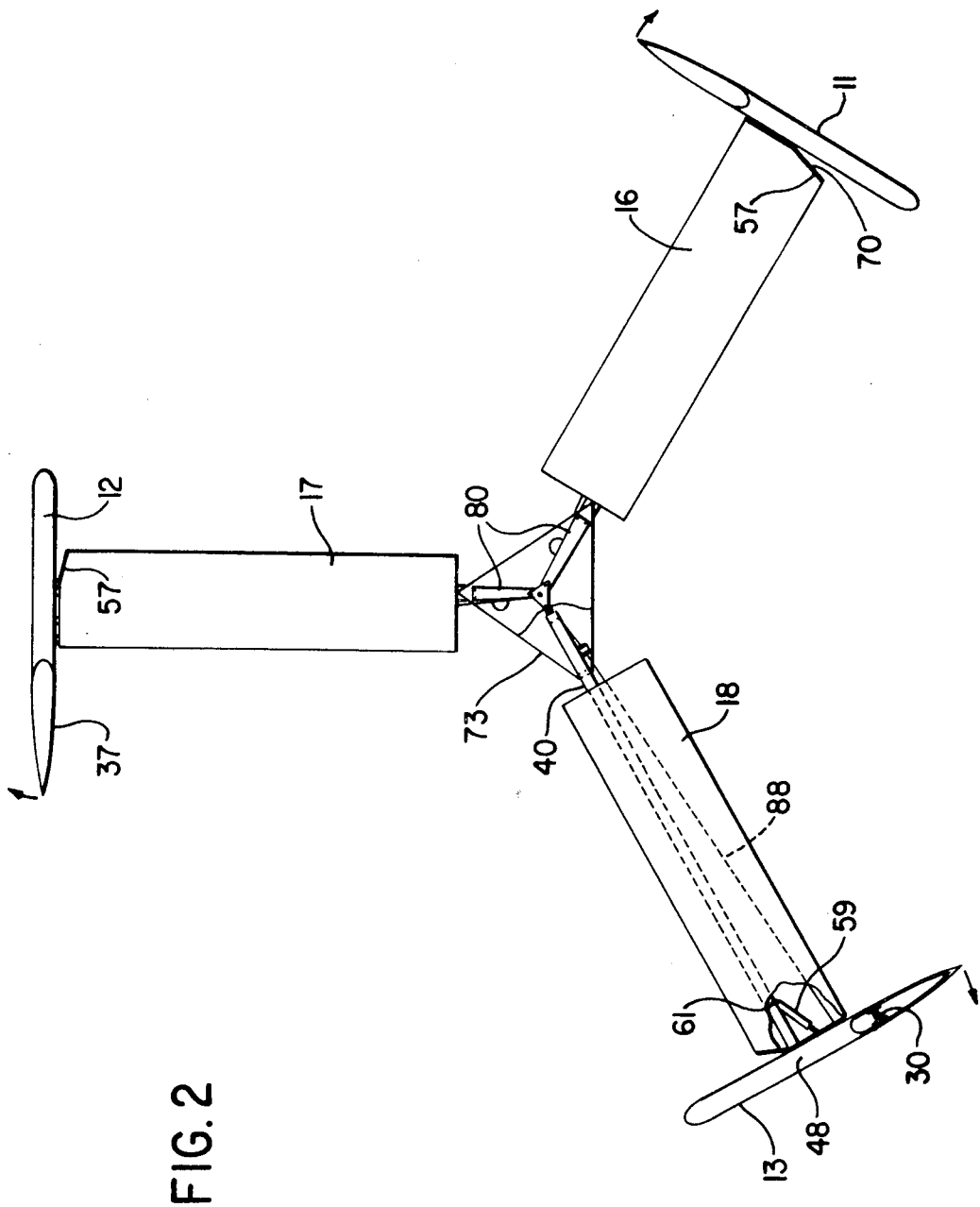
FIG. 2 is a plan view, partly broken away, illustrating the arms and blades of the turbine of FIG. 1 and the mounting arrangement therefor.
Figure 3:
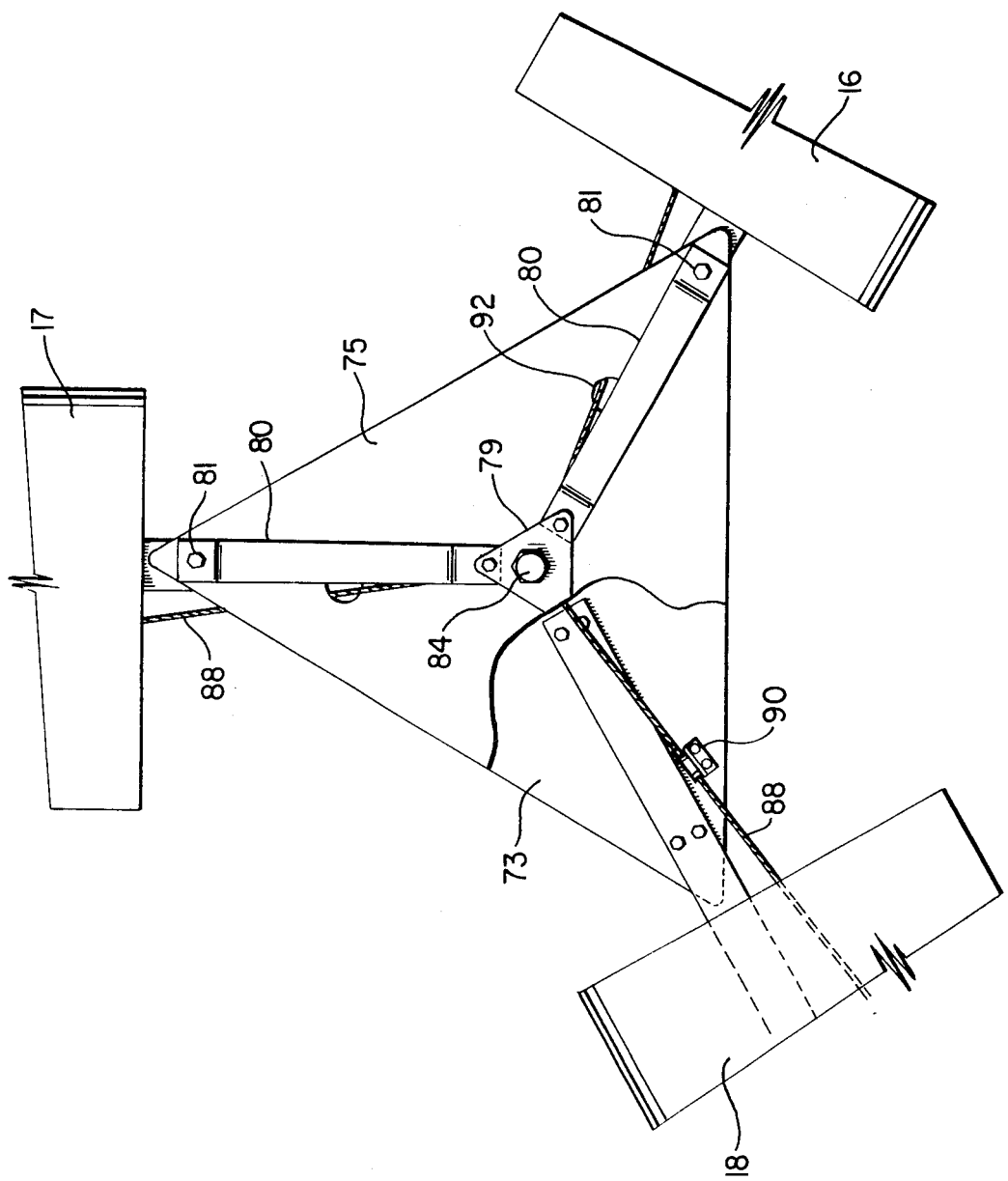
FIG. 3 is a detailed view of the support mechanism for the three arms of the turbine.

As shown in FIGS. 1 and 2, each end of each blade is covered by a flat plate 37. In FIG. 2 one of these end plates 37 has been removed to show the I-beam 30. The plates 37 have the shape of the aerofoil and have suitable flanges (not shown) that fit snugly inside the skin 32. These flanges would be fastened to the skin with blind rivets in a known manner. The plates 37 at the lower end of each blade would have suitable drain holes near the leading and the trailing edges of the blade so that there will be no danger of the blades holding any rainwater.

Figure 6:
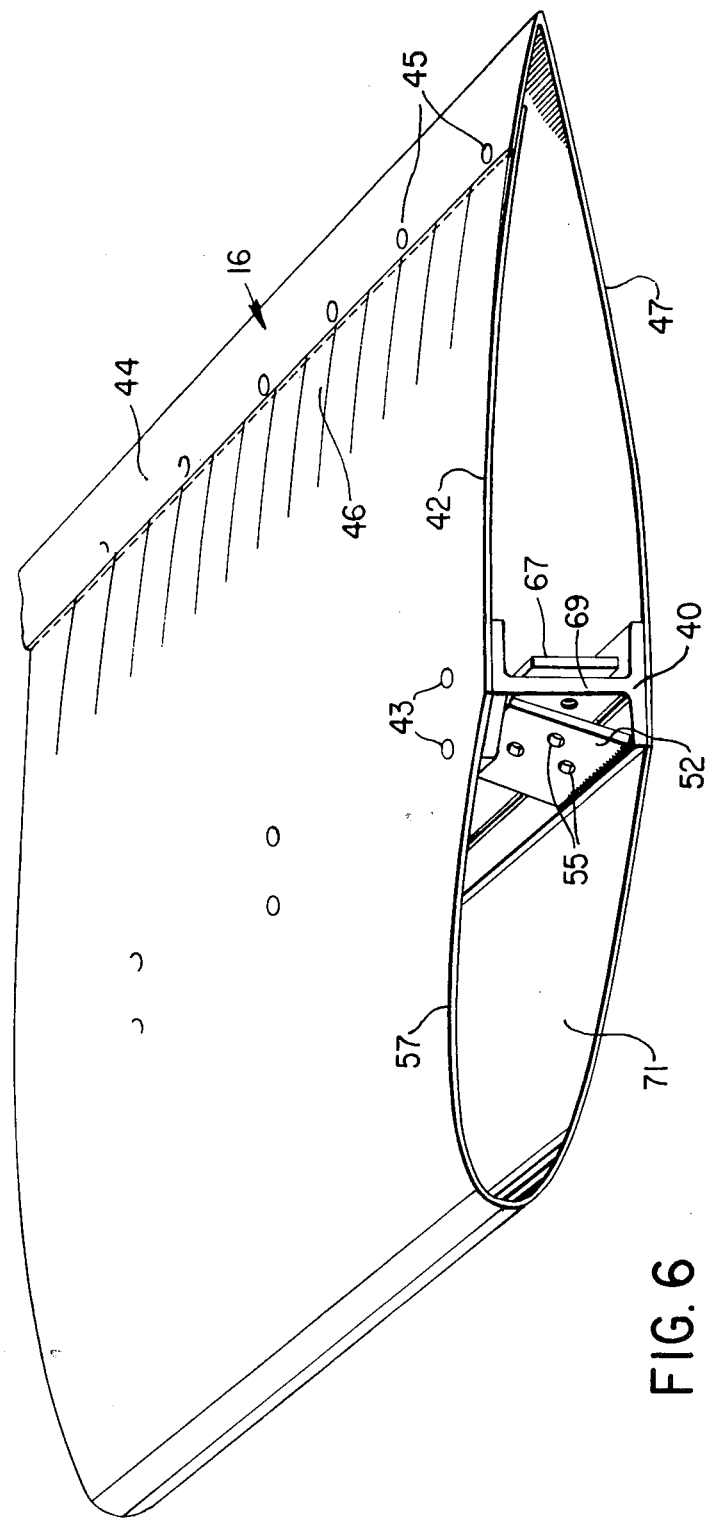
FIG. 6 is a detail showing the construction of the outer end of each blade-supporting arm.

The preferred construction of the three arms 16 to 18 can be seen from FIG. 6 of the drawings. Each support arm is constructed from a rigid I-beam 40 to which a metal sheet forming an arm skin 42 is attached by means of blind rivets 43. It will thus be seen and examination of FIG. 6 will reveal that the arm is constructed in basically the same manner as each blade. Thus at the trailing edge of the arm there is a lap joint 44 which again is secured by blind rivets 45 spaced along the joint. Preferably an epoxy filler 46 is also used at the joint 44 in order to provide a very smooth air flow over the trailing edge. The aerodynamic shape of the arms is preferably such that each arm produces a minimum aerodynamic drag.

The preferred method for connecting each blade 11 to 13 to its respective arm will now be described with reference to FIGS. 2, 5 and 6. A suitable hinge 48 is firmly connected to each of the blades in the manner shown in FIG. 5. A cut-out 49 of rectangular shape is formed in the skin 32 of the blade to accommodate the cylindrical center portion of the hinge. The blade of hinge 48 is securely fastened to the I-beam 30 in such a manner that the skin 32 is sandwiched between the hinge and the I-beam. The I-beam is threaded to accept the hinge bolts 50. By providing the cut-out 49 the knuckle 51 of the hinge protrudes a minimum amount from the skin surface. Also the hinge will be mounted flat against the skin 32 without any misalignment. Although a conventional hinge is shown, it will be appreciated that a special hinge might be used which would provide a more streamline blade-arm joint.

Figure 7:
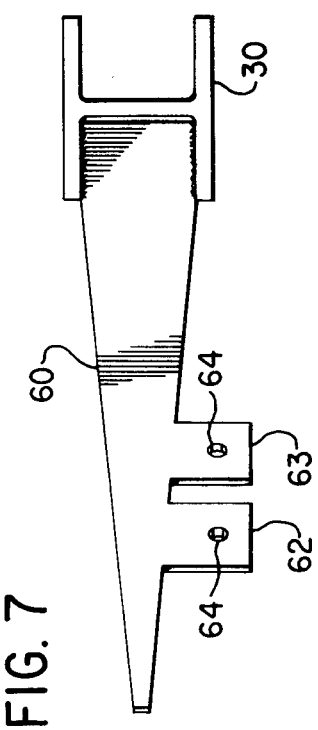
FIG. 7 is a detail view of the plate to which the blade control cable and the blade damper are connected.

A mounting bracket for the hinge 48 is welded to the I-beam 40 of the adjoining arm. This bracket 52 is connected to the wing 54 of the hinge by means of bolts (not illustrated). These bolts extend through tapped holes 55 formed in the bracket 52. It will be particularly noted that the bracket is welded at an angle relative to the web of the I-beam. The size of the angle between bracket 52 and the web of the I-beam will be discussed in detail hereinafter in connection with FIG. 7 of the drawings.

As shown in FIG. 6, the outer end of each arm 16 to 18 is bevelled near the leading edge at 57 in order that the blade will be free to pivot about the hinge joint. In addition to the hinge connection, there is provided a hydraulic damper 59 connecting each blade to its respective arm. The cylinder end of the damper is connected to a respective arm by means of a suitable pin and retaining clips located approximately at 61 (see FIG. 2). The rod end of the damper is attached to a connecting plate 60 mounted in the blade. The shape of the plate 60 and its relationship to the I-beam extending through the blade can be seen clearly from FIG. 7. The plate or bracket is uniformly tapered throughout most of its length. At its wide end, the plate 60 has parallel sides and along these parallel sides and the adjoining end the plate is welded to the I-beam 30. Projecting from one side of the plate are two tabs 62 and 63, each of which has a hole 64 formed therein. As can be seen from FIG. 5, the plate 60 extends rearwardly from the I-beam at an acute angle relative to the longitudinal axis of the I-beam. The tapered portion of the plate 60 is dimensioned so that it fits freely inside the aerofoil skin without touching the skin. The angle between the plate and the I-beam is such that the tabs 62 and 63 will enter the adjoining arm end in line with the arm chord line. In particular the angle used is determined from the selection of the blade slant back angle discussed fully hereinafter in connection with FIG. 7. The plate 60 would be attached to the I-beam prior to the insertion of the latter in the aerofoil skin 32. It will be noted that a cut-out is formed in the skin 32 at 65 to permit the outward projection of the tabs. Instead of the single sheet of material shown in FIG. 5 to form the skin 32, two or more pieces could be used. If two pieces were used for example, the cut-outs 49 and 65 can be made at the joint between the two pieces, this joint being located at the center of the blade. With this design, complete forming of the aerofoil shape except for the application of the epoxy filler would be permitted prior to insertion of the I-beam.

Returning now to the damper feature, the rod end of the damper 59 is pivotally connected to the tab 62 with a suitable pin. In normal operation of the turbine, the dampers 59 serve to damp out any tendency of the blades to respond to gusty wind conditions, particularly in the parked condition. The dampers can also act to limit the degree of blade deployment if necessary since the blades can not pivot further about the hinges 48 any more than is permitted by the full extension of the dampers.

Preferably the outer end of each arm is provided with an adjustable stop 67 which is connected to the web of the I-beam 40. One wing of the adjoining hinge 48 normally rests against the adjustable stop. It will be readily seen that movement of the adjustable stop inwardly or outwardly along the I-beam will result in adjustment of the blade angle. Adjustment means can be provided by tapping two bolt holes 69 in the web of the I-beam (only one of which is shown in FIG. 6). Two elongated holes (not shown) are formed in the adjustable stop 67 and two bolts would extend through these holes into the holes 69. Preferably a removable plate 70 is provided to cover the outer end of each arm in the region of the bevel 57. This plate which can be made of sheet metal helps to reduce blade arm drag and prevents unnecessary pick up of rain and snow. The plate 70 has the same shape as the opening 71 formed between the leading edge of the blade and the I-beam 40. The plate 70 is installed after the bolts are screwed into the holes 55 to connect the hinge. The plate should be attached in the removable manner so that maintenance of the blade and arm connecting mechanism can readily be carried out.

Figure 4:
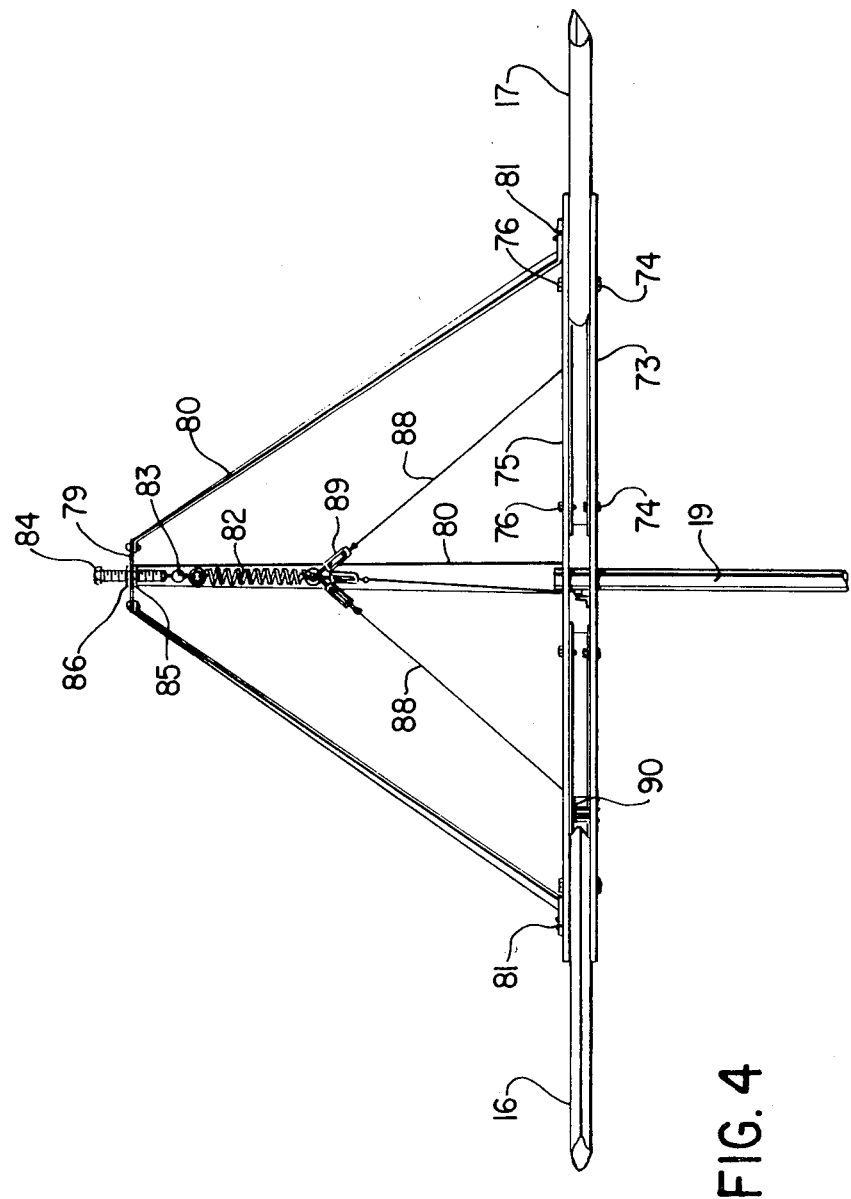
FIG. 4 is a side view of the support mechanism at the inner end of the arms, the shroud cover being removed.

The apparatus for connecting the arms 16 to 18 to the center shaft 19 will now be described with particular reference to FIGS. 2 and 4. Each I-beam 40 is connected to a corner of a triangular shaped plate 73 by means of bolts 74. The plate 73 is in turn welded to the shaft 19 so that the plate is in a horizontal plane. A second triangular plate 75 is connected by means of bolts 76 to the top flanges of each I-beam. A hole 77 formed in the center of plate 75 has a diameter close to that of the shaft 19 and thus the top plate increases the overall stability of the blade arm assembly. Supported above the top plate 75 at the center thereof is a small triangular plate 79 which is rigidly connected to three legs 80. The legs 80 extend outwardly and downwardly to the plate 75 to which they are connected by means of bolts at 81. The plate 79 acts to support and locate a coil spring 82. The upper end of the spring is connected by means of a swivel 83 to an adjustment bolt 84. The bolt 84 is threaded through two nuts 85 and 86, one located on each side of the plate 79. It will be appreciated that the upper nut 86 is welded to the plate and the plate is provided with a hole through which the bolt 84 extends. The tension in the spring 82 can be easily and readily adjusted by moving the bolt 84 upwardly or downwardly. The aforementioned shroud 20 can be readily attached to the three arms 80 and it acts to protect the spring 82 and the spring support assembly from the weather.

It is very desirable in a wind turbine to provide a positive speed limiting mechanism so that the wind turbine will not be damaged by high winds and surrounding property or persons located close by will not be endangered by failure in the turbine structure. In the turbine disclosed herein an overspeed control is provided by hinging the blades on the arms in the above described manner. In addition means are provided for biasing each blade towards the normal operating position shown in FIG. 2. In this position the blade chord line is generally perpendicular to the longitudinal axis of the adjoining arm. The biasing means are overcome by centrifugal forces acting on the blade when the rotational speed of the blade reaches a predetermined limit resulting in the blade pivoting to a drag position. As indicated above, the limit to which the blade can pivot is defined by the maximum amount to which the damper can extend. In the preferred embodiment shown in FIGS. 2 and 4, the biasing means includes a control cable 88 connected at one end to the tab 62 mounted on the respective blade. The other end of the cable 88 is connected through a turnbuckle 89 to the aforedescribed spring 82. Each cable is guided by a pulley 90 which is bolted to the triangular plate 73. The cable is able to pass through a hole 92 formed in the plate 75. A suitable cable clip is used to secure the cable to the turnbuckle 89 which is coupled to the lower end of spring 82 by means of a ring.

For proper operation of the described wind turbine it is very desirable that all three blades have equal spring tension to bias them. If tension is not equal, unequal degrees of blade deployment can result and this in turn could cause an unbalanced condition and introduce vibration. To insure equal tension, the turnbuckles 89 are adjusted so that the spring 82 is vertical. The procedure for making this adjustment is facilitated by dropping a plum bob from the lower end of the spring to near the top of the shaft 19. The turnbuckles are then adjusted to cause the plum bob to locate in the center of the top of the shaft. The bolt 84 is then set to give the desired spring tension and locking nut 85 is tightened to secure the setting.

The spring 82 is preferably sized so that if one of the cables breaks during operation of the turbine the spring will swing enough in a direction determined by the forces resulting from the centrifugal loads on the two blades still having operating cables and will cause all three blades to quickly assume a drag position. The turbine would then slow down or, depending on the wind conditions, come to a smooth stop. Spring failure or failure of the spring coupling parts would cause an equivalent non-destructive action. In the event of such failures, the dampers 59 serve to limit the degree of blade deployment and they prevent the blades from flapping in the wind until control cable/spring repairs are done.

Figure 8:
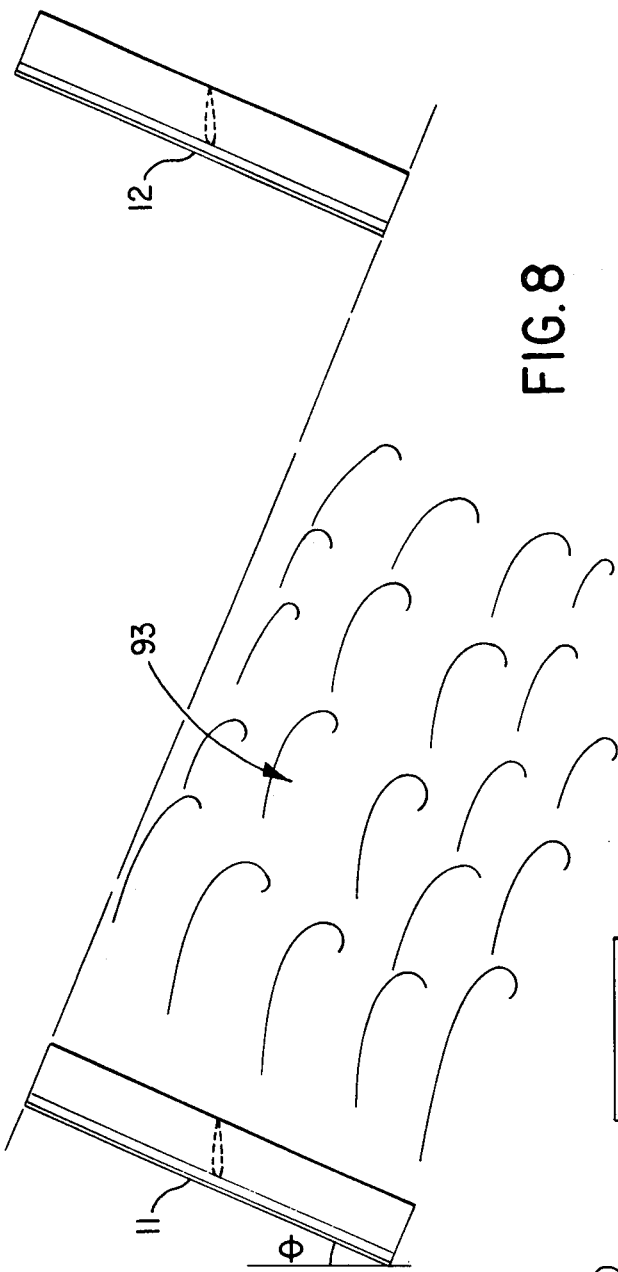
FIG. 8 is an illustration of the manner in which the blades used on the turbine operate.

Reference will now be made to FIG. 8 of the drawings which illustates the reason for the slant back feature of the blades in the present wind turbine. Two blades of the turbine have been illustrated in a laid out fashion which shows how they follow one another in a horizontal plane. The angle of slant back $\theta$ from the vertical for a given machine is a function of turbine diameter, blade length and the number of blades used. The angle of slant is determined from these parameters after desired characteristics such as solidity, blade aspect ratio, cost etc. have been determined. It has been confirmed through wind tunnel tests that, in the case of a straight blade having a top and a bottom that are disposed at a right angle with the leading edge of the blade, the optimum angle of slant corresponds closely ($\pm$ a few degrees) to that which would result in a line drawn from the top of one blade to the bottom of the following blade such that the top of the first blade is parallel to the bottom of the second blade without any overlapping. In other words, on the basis of the same assumption with respect to the disposition of the top and bottom of the blade, the angle of slant is such that a line drawn from the top of one blade to the bottom of the following blade is perpendicular to the longitudinal extent of the blades. For a typical selection of solidity, aspect ratio, etc., the resulting angle $\theta$ is such that the change in turbine swept area (as compared with no slant and all other parameters being equal) is very small ($\pm$). Tests have shown that slanting the blades as described results in a very much improved turbine power co-efficient. It is theorized that the slant back angle results in a significant portion of the wake 93 from the retarding turbine blade bypassing the path of the advancing blade and this results in a very much improved, effective lift/drag ratio. From an aerodynamic point of view, the blades of the turbine may be slanted forward and still realize much the same benefits as the slant back configuration. However, by slanting back the blades a component of vertical lift on the rotating mechanism will be obtained and this will result in the reduction of bearing loads caused by the mass of the rotating mechanism. As a reduction in the bearing loads is desirable, the slanting back configuration is the preferred arrangement.

Figure 9:
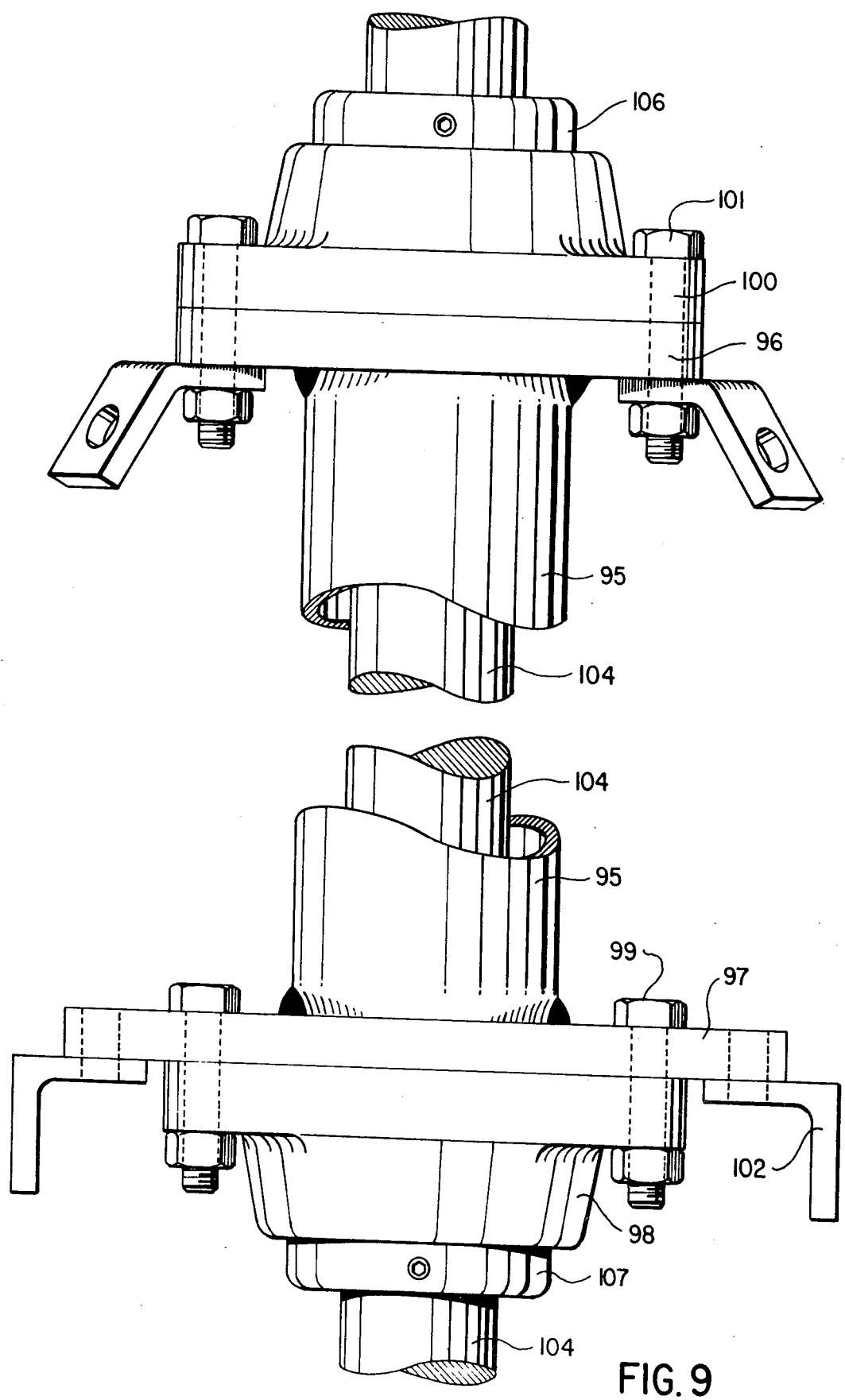
FIG. 9 is a side view, partly broken away, of support apparatus on which the wind turbine can be mounted.

FIG. 9 of the drawings illustrates an alternative and preferred method of guying, supporting and bearing mounting the wind turbine of the invention. This preferred support apparatus includes a tower or hollow shaft 95 which is preferably made of steel and has a square plate 96 welded to its top end. A larger square plate 97 is welded to the lower end of the tower. Holes in both plates 96 and 97 snugly accommodate the ends of the tower so that the top end of the tower is flush with the top of plate 96 and the bottom end of the tower is flush with the bottom surface of plate 97. A four-bolt, flange mounted self aligning bearing 98 is bolted to the bottom of plate 97 by means of the nuts and bolts 99. A similar bearing 100 is bolted to the top of plate 96 with four nuts and bolts 101. The lower plate 97 is bolted at its outer extremities to a suitable frame 102 which is provided with sturdy legs (not shown). As with the apparatus shown in FIG. 1, the overall assembly is securely supported on a concrete base resting on earth. A rotating shaft 104 which can be solid or hollow is arranged concentrically in the tower 95 and is held in the upper and lower bearings 100 and 98 by locking collars 106 and 107. The top end of shaft 104 is attached to the triangular plates 73 and 75 in the same manner as the shaft shown in FIG. 4. The lower end of shaft 104 could be coupled to an alternator or a mechanical device such as a pump through a suitable flexible coupling. As indicated earlier, a speed increaser can be attached to the flexible coupling if necessary. As with the first embodiment, the base of the supporting structure for the tower 95 can be hinged to the concrete base to facilitate erection and maintenance.

The support structure of FIG. 9 is preferred over that shown in FIG. 1 because it eliminates loads on the rotating shaft due to guying and the necessary hollow tower 95 is readily available. Moreover with this arrangement the rotating shaft 104 is not exposed to the elements. A tubular tower is more visually pleasing than other possible types such as a lattice type.

It will be appreciated from the above description that the disclosed wind turbine eliminates exposed tie wires as used in other known machines. The mechanism provided for controlling the speed of the turbine permits it to remain operating despite extreme wind speeds and thus the turbine has a higher annual power output.

Moreover the wind turbine disclosed herein is quite reliable and safe even under severe icing conditions that might hamper the operation of spoilers used in known wind turbines. Because the entire blade acts as an air brake under conditions that might cause overspeeding, there is little possibility that blade deployment will be hindered by icing.

It will be readily apparent to those skilled in this art that certain features and aspects disclosed herein could readily be adapted to other turbines of similar design having more or less blades than the three in the disclosed embodiment. Also of course turbines with more than one arm per blade could incorporate the main improvements disclosed herein. Some of the disclosed features could for example be used in a turbine which does not have straight blades. It will also be realized that, because of the relatively simple design and construction of the present wind turbine, the teachings of the present invention can be used in the construction of either a one of a kind unit or production units.

Not only can the design construction disclosed herein be used for a wind turbine but it is also adaptable for use as a water turbine. When used in moving water, the illustrated turbine could be inverted for projection of the blades into the water. Such a water turbine might be installed either on a river or in a suitable ocean tidal area. The present construction is also adaptable for use as an instrument to measure ocean currents or to measure wind speed. When used as a measuring device, the turbine would be made on a much smaller scale than a turbine intended for the generation of power.

Figure 10:
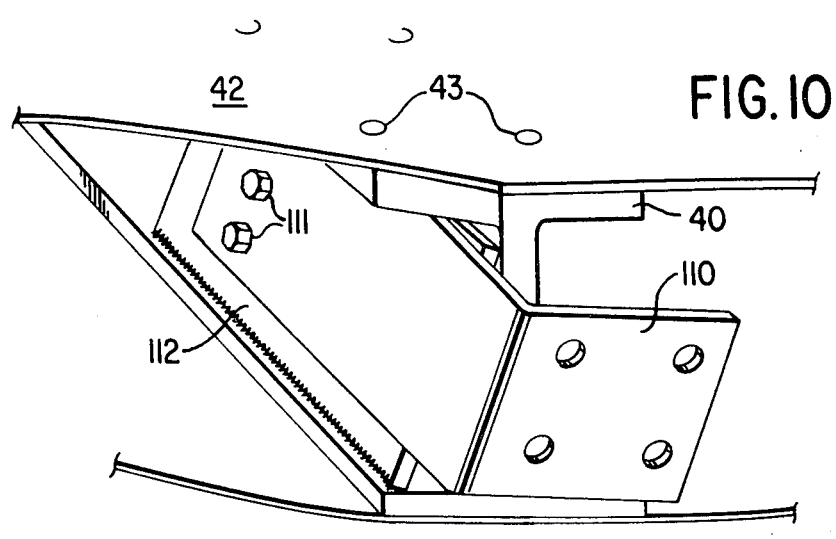
FIG. 10 is a detail illustrating an alternative means for connecting the blade to its supporting arm.
Figure 11:
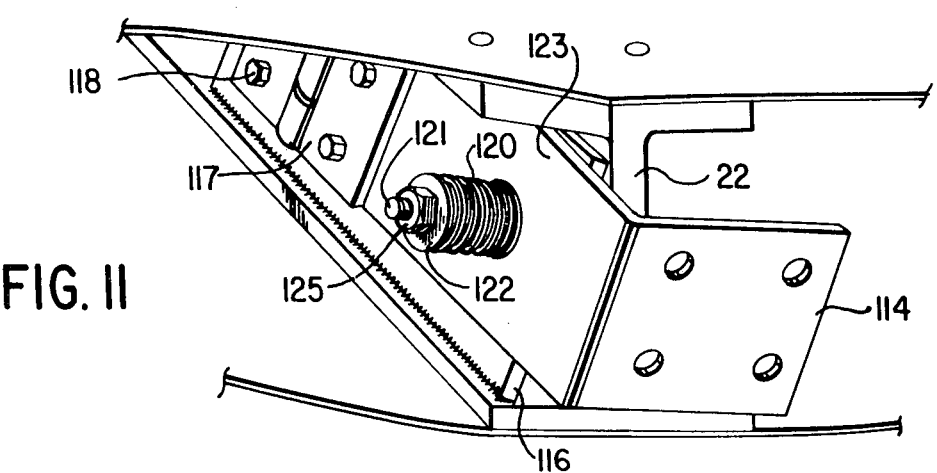
FIG. 11 is a detail showing a further alternative for connecting the blade to its support arm.

FIGS. 10 and 11 show alternative means for biasing the blades 11 to 13 towards the normal operating position. In FIG. 10 the hinge 48 of the first embodiment is replaced by a right angle leaf spring 110. One end of this leaf spring is bolted at 111 to the bracket 112. The bracket 112 is connected to the I-beam 40 in the same manner as the bracket 52 shown in FIG. 6. With this construction, the spring 110 acts as both a hinge and a biasing means. Thus with this construction there is no need for the centrally located spring 82, the connecting cables 88 or the shroud. The bracket 112 is longer than the bracket 52 in order to permit the spring to be bolted closer to the center of the turbine, thus permitting suitable freedom for the hinging movement. Use of leaf spring 110 would not provide the adjustment capabilities advantages of the first embodiment. If one wished, the spring 110 could be used in conjunction with a central biasing spring 82 and, in this case, the spring 110 would serve primarily as a hinge.

The second alternative shown in FIG. 11 employs a right angle bracket 114 that is connected to a mounting bracket 116 by means of hinge 117. One wing of the hinge 117 is bolted at 118 to the bracket 116 while the other wing is securely bolted or riveted to the bracket 114. A spring action is provided by a compression spring 120, through which extends a bolt 121. The spring 120 is compressed between a washer 122 located on the inside of nut 125 and the side 123 of the bracket 114. It will be appreciated that the bolt 121 extends through a clearance hole formed in the bracket 114 so that the bracket is free to move relative to the bolt against the force of the spring. The bolt 121 also of course extends through a suitable hole formed in the bracket 116. By adjusting the nut on bolt 121, different spring loadings can be achieved. As with the embodiment of FIG. 10, this second alternative would eliminate the central spring 82 of the first embodiment and would not provide some of the desirable features of the first embodiment. However, both alternative constructions would simplify the construction of the turbine.

Figure 12:
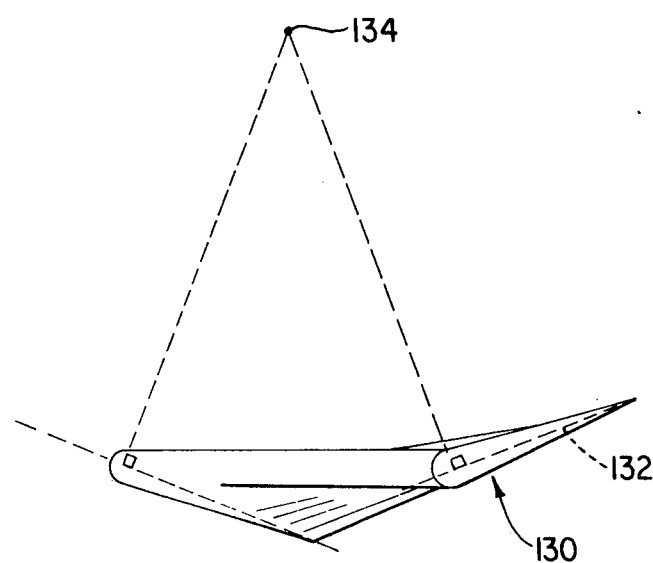
FIG. 12 is a detail view illustrating a preferred blade construction wherein the blade is twisted about a longitudinal axis.

FIG. 12 illustates an improved blade construction wherein the blade 130 has a blade chord line 132 which is substantially tangential to the circle of rotation of the blade at all points along the length of the blade. The circle of rotation has its centre at 134 in FIG. 12, this centre being located along the centre axis of shaft 19 shown in FIG. 4. Thus the blade 130 is twisted about a longitudinal axis thereof such as the longitudinal axis defining the front edge of the blade. With the straight blade construction shown in FIGS. 1 and 2, the blade chord line is tangent to the circle of rotation only at the mid-point of the longitudinal length of the blade. The angle between the blade chord line and the tangent increases from zero degrees as one moves towards the blade top or blade bottom. Incorporating the illustrated twist in the blade has the distinct advantage of preventing blade stalling for most, or all, blade speed-wind speed conditions. With the blade arrangement of FIG. 12, aerodynamic lift at all points in a revolution will be provided as at least part of the blade will be disposed at an angle of attack to provide lift in view of the slant configuration. If the blade is both slanted and twisted as shown and described, the blade efficiency is greatly increased over conventional straight, vertical blades. The blade 130 could be constructed in the same fashion as described above in connection with the straight blades 11 to 13. Alternatively it could be constructed by other known techniques such as molding, assuming one employs a sufficiently strong material that can be molded.

While the invention has been described in considerable detail, the applicant does not wish to be limited to the particular embodiments shown and described and it is the applicant's intention to cover all adaptations, modifications, and arrangements of the invention which come within the permissible scope of the accompanying claims.

I claim:

1. A fluid operated apparatus comprising:
a vertical rotatable shaft, at least one arm extending radially outwardly from said shaft and fixedly connected thereto at one end;
an elongated, aerofoil-shaped blade connected to the other end of said one arm so that said blade can pivot about a non-horizontal axis, said blade having a blade chord line at the point where the blade connects to the arm that in the normal operating position of the blade is normal to a longitudinal axis of said one arm, wherein the leading edge of said blade is disposed at a fixed acute angle relative to the vertical at all rotational speeds about the axis of such shaft, which angle is located in a plane generally tangential to the path of rotation of said blade; and means for biasing said blade towards said normal operating position, said biasing means being overcome by centrifugal forces acting on said blade when the rotational speed of said blade reaches a predetermined limit resulting in said blade pivoting to a drag position.

2. A fluid operated apparatus according to claim 1, including at least three arms extending radially outwardly from said shaft with one aerofoil-shaped blade pivotally connected to the outer end of each arm by means of a hinge.

3. A fluid operated apparatus according to claim 1, wherein said biasing means includes a control cable connected at one end to said blade and at the other end to a control spring, said control cable extending from said blade inwardly through the interior of said arm.

4. A fluid operated apparatus according to claims 1, 2 or 3, wherein said arm is aerofoil-shaped.

5. A fluid operated apparatus according to claims 1 or 3, wherein the leading edge of said blade is disposed at a fixed acute angle relative to the vertical so as to face upwardly.

6. A fluid operated apparatus according to claim 3, having a single control spring and three control cables to provide said biasing means, each control cable being connected at one end to a respective blade and at the other end to said control spring, said biasing means further including an adjustable mount to which one end of said spring is connected, said mount providing means for adjusting the tension in said spring and the cables connected thereto.

7. A fluid operated apparatus according to claim 6, wherein said spring is an elongated coil spring having a center axis that is normally coaxial with said shaft and connected at one end to an adjustable bolt.

8. A fluid operated apparatus according to claim 6, wherein an inner end portion of each control cable extends at an angle to the horizontal from a respective arm and each said inner end portion and said control spring are covered by a shroud.

9. A fluid operated apparatus according to claims 1, 2 or 3, including damping means connected at one end to said blade and at the other end to said arm to control pivotal movement of said blade.

10. A fluid operated apparatus according to claim 1, 2 or 3, wherein the blade is twisted about a longitudinal axis thereof whereby the blade chord line of the blade is substantially tangent to the circle of rotation of the blade at all points along the length of said blade.

11. A fluid operated apparatus according to claim 3, wherein said biasing means is a bent leaf spring connecting said blade to said at least one arm, said spring permitting said blade to pivot relative to said arm.

12. A fluid operated apparatus according to claims 1 or 3, wherein said biasing means includes a bent bracket, one end of which is pivotally connected by a hinge to said arm and the other end of which is connected to said blade, and a spring mechanism biasing said bracket to a first position where said blade is in said normal operating position, said bracket pivoting to a second position where said blade is in said drag position when said predetermined speed limit is reached or exceeded.

13. A fluid operated apparatus according to claims 1 or 3, adapted to be rotated about the vertical axis of said shaft by wind forces, said apparatus including means for rotatably supporting said shaft, an electrical power generating means, and means for connecting said shaft to said generating means.

14. A fluid operated apparatus according to claim 10, adapted to be rotated about the vertical axis of said shaft by wind forces, said apparatus including means for rotatably supporting said shaft, an electrical power generating means, and means for connecting said shaft to said generating means.

15. A fluid operated apparatus according to claim 10, wherein said longitudinal axis defines said leading edge of said blade.

16. The fluid operated apparatus of claims 5 or 7, including at least three arms extending horizontally from said shaft and one aerofoil-shaped blade pivotally connected to the outer end of each arm by means of a hinge.

17. The fluid operated apparatus of claim 10, including at least three arms extending horizontally from said shaft and one aerofoil-shaped blade pivotally connected to the outer end of each arm by means of a hinge.

* * * * *